Feb. 10, 1959  J. W. GRAHAM ET AL  2,873,423
WELL LOGGING METHOD
Filed Aug. 22, 1956  2 Sheets-Sheet 1
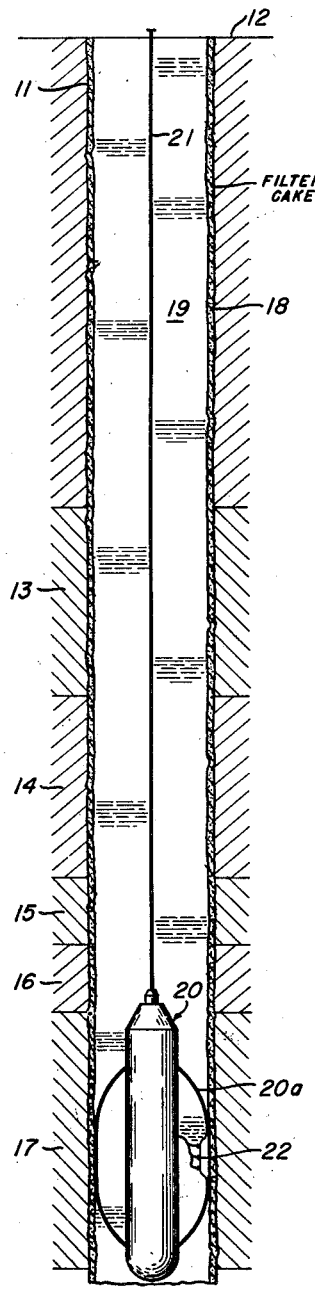
FIG. 1.
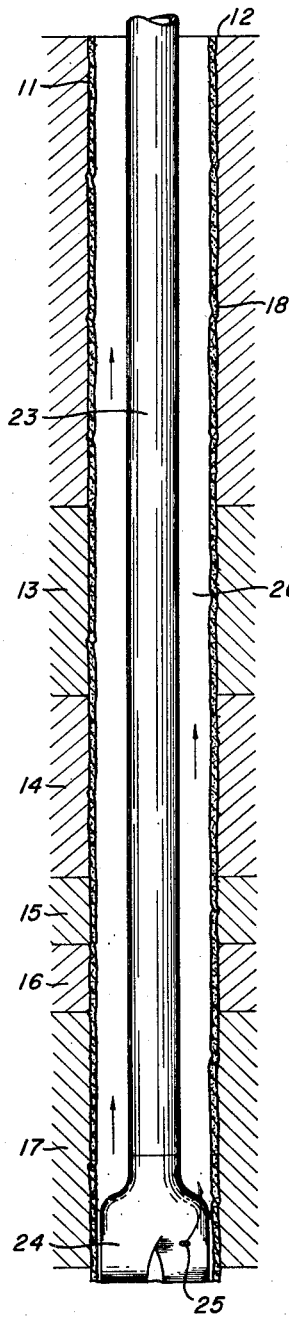
FIG. 2.
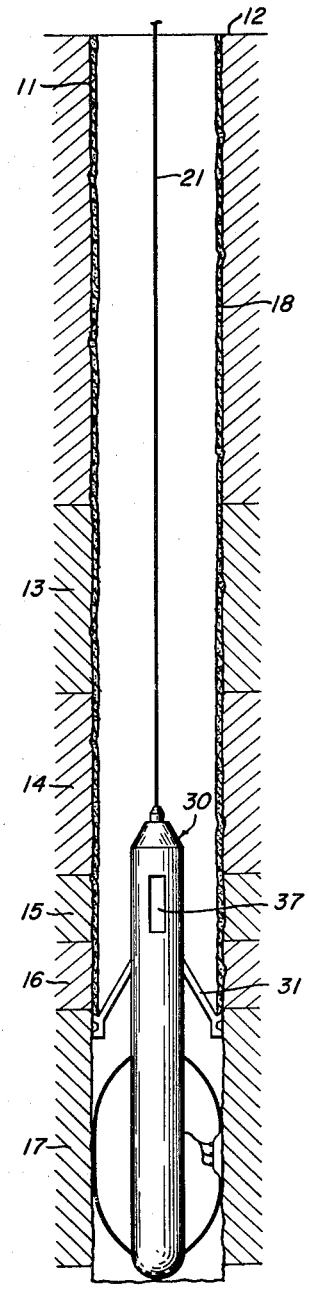
FIG. 3.
INVENTORS.
John W. Graham,
Frederick M. Perkins, Jr.,
Charles L. Prokop, & Richard A. Salathiel.
BY 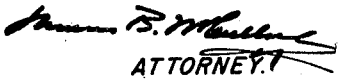
ATTORNEY.

Feb. 10, 1959 J. W. GRAHAM ET AL 2,873,423
WELL LOGGING METHOD
Filed Aug. 22, 1956 2 Sheets-Sheet 2
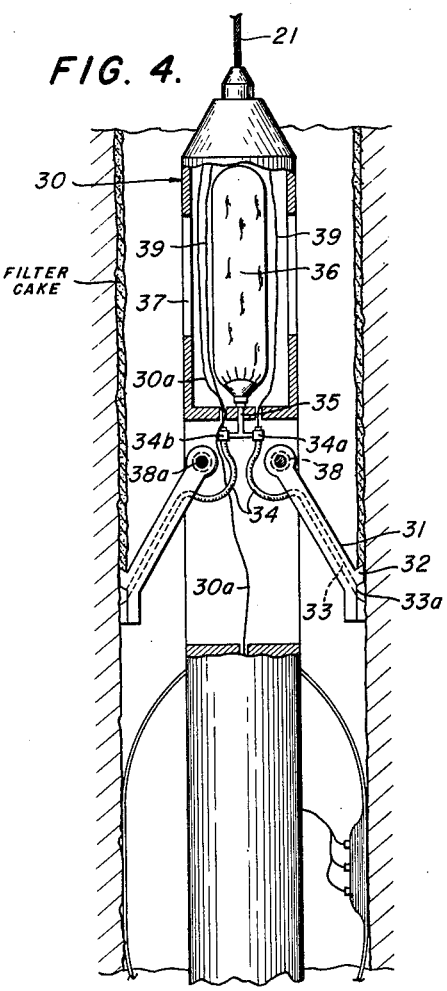
FIG. 4.
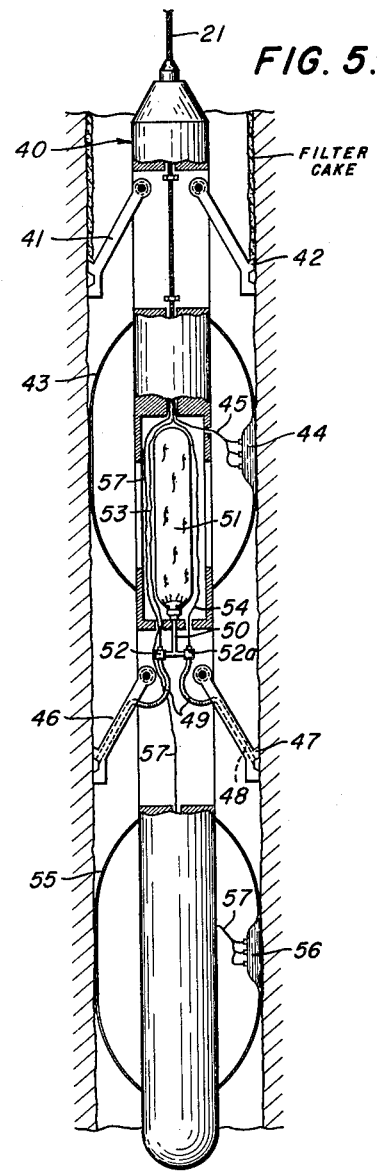
FIG. 5.
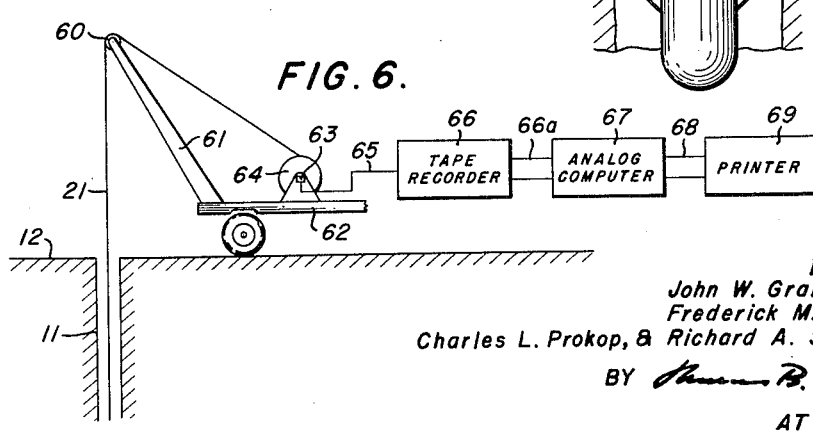
FIG. 6.
INVENTORS.
John W. Graham,
Frederick M. Perkins, Jr.,
Charles L. Prokop, & Richard A. Salathiel.
BY 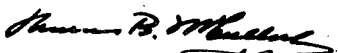
ATTORNEY.

2,873,423

WELL LOGGING METHOD

John W. Graham, Bellaire, and Frederick Myers Perkins, Jr., Charles L. Prokop, and Richard A. Salathiel, Houston, Tex., assignors, by mesne assignments, to Jersey Production Research Company, Tulsa, Okla., a corporation of Delaware Application August 22, 1956, Serial No. 605,671

27 Claims. (Cl. 324—1)

The present invention is directed to a method for logging wells. More particularly, the invention is concerned with locating the presence of hydrocarbons in subsurface earth formations. In its more specific aspects, the invention is directed to determining the presence of hydrocarbons in subsurface earth formations penetrated by a well bore wherein the subsurface earth formations have been invaded by water or by aqueous filtrate from drilling fluid.

The present invention may be briefly described as a method for logging a well penetrating subsurface earth formations for the presence of hydrocarbons in said earth formations in which an electrical log of the earth formations is obtained following which the earth formations are contacted with a solution containing a surface active agent which causes preferential wetting of the earth formations by any hydrocarbons present in the contacted earth formations. After the contacting operation an electrical log is again obtained of the contacted earth formations. As a result, two electrical logs are obtained wherein the contacted formations indicate a different electrical resistivity or potential when hydrocarbons are present than the electrical resistivity or potential prior to the contacting operations. By virtue of the difference in the electrical resistivity or potential wherein hydrocarbons are present and shown after the contacting operation, it is possible to determine accurately the presence of hydrocarbons, such as oil and/or gas, in the particular formations. This is extremely valuable and important in that when formations are invaded by filtrate from drilling mud or other invading fluids, it is sometimes difficult, if not impossible to determine accurately the presence of petroleum, such as oil or gas in the formations. As a result, valuable reservoirs may be overlooked with the consequent loss to the economy of this country. The present invention obviates and overcomes the danger of missing valuable sands, strata, formations, horizons, zones, and the like, which may contain hydrocarbons and allows the detection thereof by a simple and readily applied method.

The surface active agents employed in the practice of the present invention may be selected from a large group of surface active agents which cause preferential wetting of the earth solids, such as sand, clay, shale, lime, quartz, dolomite, and the like, with hydrocarbons which may be present therein. The earth or rock solids prior to the contacting operation are preferentially wet by the water in the rock solids. After the contacting operation the earth or rock solids are preferentially wet by the hydrocarbons.

Among the surface active agents which are valuable and operable in the present invention may be mentioned the amine salts, the ammonium salts, and many others of a similar type. Specifically, the cationic salts are valuable and useful in the present invention. Exemplary of the compounds which have been found suitable in preferentially wetting rock solids by the hydrocarbons contained therein may be mentioned octadecyl amine acetate, cetyl dimethyl amine acetate, Tetrosan, a cationic surface active agent sold by Onyx Oil & Chemical Co., Jersey City, N. J., the acetate of Primene JM–T, which is a mixture of primary amines with branched chains containing from 15 to 20 carbon atoms, sold by Rohm & Haas, Arquad 2–C which is dicoco dimethyl ammonium chloride prepared from coconut oil, the amine acetate prepared from Primene 81–R, which is a mixture of primary amines containing branched chains of 12 to 15 carbon atoms, sold by Rohm & Haas, alkyl tolylmethyl trimethyl ammonium chloride, alkyl dimethyl benzyl ammonium chloride, lauryl benzyl dimethyl ammonium chloride, bis quaternary salts such as reaction products of 2-octyl benzyl chloride with bis dimethyl amino butyne and nonyl benzyl chloride with bis dimethyl amino butene, di-isobutyl cresoxyethyl dimethyl benzyl ammonium chloride and di-isobutyl phenoxyethoxy ethyl dimethyl benzyl ammonium chloride, and the like.

The amounts of the surface active agents which cause preferential wetting of the earth formations by any hydrocarbons present therein may range from an amount sufficient to contact the rock solids with from about 0.1 to about 10 volumes of solution containing the surface active agent. In this respect, it must be understood that the amount of rock solids which must be contacted with the solution containing the surface active agent will ordinarily not be greater than an annular volume of the rock extending no more than about 5 inches from the well bore, usually above 3 inches. For example, it has been shown that 10 volumes of flushing solution containing 0.1% by weight of the surface active agent results in about half the effect of two volumes of flushing solution containing 1% by weight of the surface active agent. Solution volume is the volume of aqueous medium contained within the zone of investigation by the particular logging device being used in logging the well. In general, it may be stated that a preferred amount of a surface active agent in the solution may range from about 0.5% to about 1.1% by weight of surface active agent in solution contacting the formation. While this is a preferred amount, an upper limit for the surface active agent is about 5% by weight of the solution and a lower limit is about 0.01% by weight.

The surface active agent is suitably dissolved in an aqueous solution such as fresh or salt water although other solutions may be employed. Alcoholic solutions may be used and under some conditions it may be desirable to adjust the pH of the solution depending on the type of surface active agent which is employed.

In practicing the present invention, the surface active agent may contact the formations by including the surface active agent in the aqueous phase of the drilling mud and allowing the filtrate therefrom to filter out through the filter cake into contact with the formation. In other words, once the electrical resistivity or potential of the formations has been determined, the drill stem may be inserted in the well bore and drilling mud containing the surface active agent circulated down the drill stem, out through the eyes or openings of the bit and up through the annular space between the drill stem and the wall of the well whereby filtrate would filter through the filter cake into contact with the formations. The formations may be contacted with the surface active agent only without dissolving it in a solvent therefor, although it is preferred to employ a solvent for the surface active agent. Thus, the surface active agent may be located at the proper region in the well bore by releasing it from a container lowered on a wire line or injecting it through a pipe, and the like, at the proper or desired points in the well bore such that it will dissolve in the water which will then invade porous zones.

Another way the formations may be contacted with the solution where filter cake is not of sufficient permeability for filtration therethrough within a reasonable period of time is to disrupt the filter cake with a plow or knife edge and introduce the solution directly into contact with the formation directly back of the disrupted filter cake. In most instances, however, it may not be necessary to disrupt the filter cake since the filter cake is usually of sufficient permeability to allow filtration of the solution through the filter cake into contact with the formation.

The present invention will be further illustrated by reference to the drawing in which:

Fig. 1 illustrates apparatus for determining electrical resistivity of earth formations penetrated by a well bore;

Fig. 2 illustrates the circulation of solution containing the surface active agent down the drill stem and in contact with a filter cake;

Fig. 3 illustrates apparatus by way of which the filter cake is disrupted, solution introduced into contact with the formation back of the disrupted filter cake and the electrical resistivity of the contacted formation obtained;

Fig. 4 is a partial detailed view in section of the apparatus of Fig. 3;

Fig. 5 is a view of apparatus wherein the first electrical resistivity log is obtained, the filter cake is disrupted and solution contacted with the formation back of the disrupted filter cake and the electrical resistivity of the contacted formation obtained; and Fig. 6 shows an arrangement of apparatus wherein the electrical resistivity determinations before and after the contacting operations are recorded and presented as a single log.

Referring now to the drawing in which identical numerals will be employed to designate identical parts, numeral 11 designates a well bore drilled from the earth's surface 12 to penetrate a plurality of earth formations 13, 14, 15, 16, and 17 some of which may be hydrocarbon productive and others of which may not contain hydrocarbons. As a result of the drilling operation, a filter cake, such as 18, is formed on the walls of the well bore 11.

With the drilling mud 19 filling the well bore 11, an electrical resistivity device or apparatus, such as 20, is lowered on an electrical cable 21 into the well bore 11 to obtain an electrical resistivity log of formations or sands and the like 13 to 17, inclusive, penetrated by the well bore 11. The electrical resistivity device may be any of the several well-known electrical resistivity devices available on the market, such as the device described by Doll at the Annual Meeting of the A. I. M. E., February 13–15, 1950, New York, N. Y., or suitably may be a device such as described by Doll at the Fall Meeting of the Petroleum Branch of the A. I. M. E. at Houston, Texas, October 1–3, 1952. While these devices are quite satisfactory, other devices readily available on the market may be used.

The electrical resistivity device 20 is provided with centralizers, such as 20a, on which may be arranged suitable electrodes 22 which contact the filter cake 18 or the wall of the well 11 and allow a signal to be transmitted by suitable electrical conducting means, not shown, through the electrical cable 21 to a recording device at the well head. After the electrical resistivity log of the several formations 13 and 17, inclusive, has been obtained, the device 20 is withdrawn from the well by means of electrical cable 21 and then the drill stem, such as 23, shown in Fig. 2 is inserted in the well. This drill stem 23 may have a suitable bit, such as 24, provided with eyes or passageways 25, attached to the end thereof. An aqueous solution, such as has been described, containing the surface active agent is then circulated down the hollow drill stem 23 and up the annulus 26 such that it contacts the filter cake 18 and penetrates therethrough to contact the formations 13 to 17, inclusive. As a result of the contacting of the formations in the region of the well bore 11 to an extent of about 5 inches surrounding the well bore 11, any residual hydrocarbons remaining therein resulting from the displacement of hydrocarbons by the drilling mud filtrate which has flooded the formations is caused to wet preferentially the rock solids rather than have the rock solids preferentially wet by the water. This contacting of the formations with the drilling mud filtrate containing the surface active agent or the solution containing the surface active agent may be conducted for a period of time in the range of about one to about 360 minutes sufficient to cause substantial wetting of the rock with the hydrocarbons contained in the several formations. On some occasions longer times may be necessary, as much as 24 hours, but usually shorter times in the range given will be satisfactory and preferred. Thereafter the drill stem 23 and the bit 24 may be withdrawn from the well 11 and the electrical resistivity of the contacted formations determined as shown in Fig. 1 by lowering again a device, such as 20, on an electrical cable 21 and recording the electrical resistivity of the several formations either during the lowering operation or during the raising operation or both.

In another operation wherein the filter cake 18 is not of sufficient porosity or permeability to allow ready contact of the solution or filtrate with the formation, a device, such as 30, may be lowered on the cable 21 which will cause disruption of the filter cake 18. To this end the electrical resistivity device 20 is modified to provide a plurality of extensible or extendable arms 31 having on the free end thereof plows or knife blades 32 which cause the filter cake to be disrupted or broken. The plows 32 and the extendable arms 31 are provided with an internal passageway 33 opening into the bottom of the plow in a port 33a. These passageways 33 are connected to a flexible conduit 34 in the device 30 which communicate by a conduit 35 with a reservoir 36 which contains a body of an aqueous solution containing the surface active agent of the type illustrated. The conduit 35 is provided with solenoid valves 34a and 34b operated from the earth's surface by means of electrical connecting means 39 carried to the earth's surface through the cable 21. The electrical resistivity device arranged in the body member 30 is also connected to the earth's surface by means of electrical connecting means 30a.

The reservoir 36 may suitably be constructed or formed of a deformable or resilient material which may be plastic or synthetic or natural rubber, and the like. For example, a plastic material known to the trade as Teflon may be used to construct the reservoir. The device 30 may suitably be provided with windows 37 which allow the reservoir 36 to be exposed to the hydrostatic head of drilling mud or fluid in the well to force the solution into contact with the formation since formation pressure to which the port 33a is exposed is less than the hydrostatic head of the column of drilling fluid in the well which allows the solution to be forced out into the formation and to cause preferential wetting of the rock solids by the hydrocarbons contained therein, if any. Suitably, the plow or scraper 32 may have a suitable seal embraced in the plow to provide the differential pressure into the formation; the formation of the filter cake immediately back of the plow may provide a sufficient seal for the exertion of differential pressure.

The arms 31 may be extensible by a piston arrangement or by means of coil springs, such as 38, embracing axles 38a. The arms 31 may be released at a particular level in the well by an upward pull on the cable 21 or the device 30 may be constructed like the device in U. S. Patent 2,725,282, issued November 29, 1955, to Whitman D. Mounce and Stuart E. Buckley. In this instance, the electrical resistivity device, such as 20, would be modified in accordance with the Buckley et al. patent mentioned supra to provide a structure, such as 30, wherein the electrical resistivity log of the contacted formation may be determined immediately after the filter cake has been disrupted. After the electrical resistivity log has been determined as illustrated in Figs. 3 and 4, the two recordings at the well head may be compared whereby the presence of hydrocarbons is detected.

Referring now to Fig. 5, a modified device somewhat identical to Figs. 3 and 4, is presented in which apparatus, such as 40, provided with extensible arms 41 carrying the plows 42 is arranged on the upper end of the device 40. An intermediate portion of the device 40 embodies an electrical resistivity device, such as 20, provided with centralizers 43 and electrodes 44, the electrodes 44 being connected to the surface recording equipment by suitable electrical connections 45 carried to the earth's surface through the cable 21.

The device 40 is provided with second extensible arms 46 on which are arranged plows 47 which are constructed like the extensible arms 31 and plows 32 of Fig. 4. The extensible arms and plows 47 are provided with passageways 48 which connect to flexible conduits 49 which in turn connect by a conduit 50 to a deformable or resilient reservoir 51 containing a solution having the surface active agent dissolved therein.

The conduit 50 is provided with valves, such as solenoid valves 52 and 52a, which may be operated electrically from the well head by way of electrical connections 53 and 54 which are carried to the well head by cable 21.

On the lower portion of the body member or device 40 is a second electrical resistivity device, such as 20, provided with centralizers 55 and electrodes 56 which are electrically connected to the surface recording equipment by electrical connecting means 57 which is also carried to the earth's surface by the cable 21.

In employing the device of Fig. 5, it will be clear that the operations may be conducted substantially simultaneously. The device 40 may be lowered on the cable 21 with the extensible arms 41 and 46 in a retracted position. After the device has been lowered to the lowest desired level in the well, the arms 41 and 46 would be released and the device would be gradually raised. The plows 42 would disrupt the filter cake, such as 18, and allow the electrodes 44 to contact the several formations back of the disrupted filter cake. Following the electrodes 44 would be the extensible arms 46 and plows 47 which would disrupt any reformed filter cake and cause contacting of the solution in the reservoir 51 with the formation. This will cause wetting of the formation rock material by any residual hydrocarbons in the formation rock material and thereafter the electrodes 56 will also contact the formation and allow the obtaining of the electrical resistivity of the contacted formation.

The two electrical resistivity logs may be recorded simultaneously or separately. Furthermore, the electrical resistivity logs may be combined into a single log as may be desired and the result printed as a chart.

Referring to Fig. 6 the cable 21 is carried over a sheave, such as 60, on a gin pole 61 suitably mounted on a service truck 62 to a cable drum 63 also mounted on the service truck 62. The electrical cable by means of brush arrangements 64 is electrically connected by means of electrical connecting means 65 to a magnetic tape recorder 66 which records the electrical resistivity logs as they are obtained and feeds the information therefrom through electrical connecting means 66a into an analog computer 67 of a well-known type. From the analog computer the results therefrom are fed by means of electrical connection 58 into a suitable printing device 69 which may be used to print a single electrical resistivity log which is a difference between the two logs as has been illustrated or the two separate logs may be printed.

It may be seen from the foregoing description of the several variations in our invention that it is susceptible to many operations coming within the spirit and scope thereof. It is to be understood that these several descriptions are given by way of illustration and not by way of limitation.

In order to illustrate the invention further, a number of cores from several sources were prepared to contain either brine or residual oil. For illustration purposes only, the residual oil was a kerosene. The electrical resistivity of each of the several cores was obtained employing a device similar in principle to that referred to supra. Thereafter, each of the cores was flushed with brine containing an effective amount of the surface active agent which caused preferential wetting of the rock solids by the residual hydrocarbons contained therein. Thereafter the electrical resistivity of the several cores, after the contacting operation, was determined. In Table I are presented the electrical resistivity determinations on cores which have been saturated with salt water. As has been illustrated, the electrical resistivity of these cores was determined before and after contacting with the salt water which contained a surface active agent.

TABLE I

*Water saturated cores*

| Core No. | Core Material | Brine Resistivity, $\Omega M$ | $p_1$: Core Resistivity Before Contact With Wetting Agent,[1] $\Omega M$ | $p_2$: Core Resistivity After Contact With Wetting Agent,[1] $\Omega M$ | $\frac{p_2}{p_1}$ |
|---|---|---|---|---|---|
| B-1-B | Berea Sandstone | 1.012 | 14.1 | 16.4 | 1.16 |
| B-3-B | do | 1.012 | 14.7 | 16.5 | 1.12 |
| B-4-B | do | 1.012 | 14.5 | 16.4 | 1.13 |
| Q-1 | Fused Quartz | 1.012 | 4.4 | 4.8 | 1.1 |
| Q-2 | do | 1.012 | 4.6 | 5.0 | 1.1 |

[1] Octadecyl amine acetate.

It will be seen from the data presented in Table I that the surface active agent had no appreciable effect on the electrical resistivity. In all cases, the ratio of the resistivity before and after contacting the salt water containing surface active agent of the type illustrated range from about 1.1 to 1.16.

In another series of cores wherein the cores contained residual oil, an electrical resistivity determination was obtained both before and after contacting with a solution containing the surface active agent. These results are presented in Table II:

TABLE II

*Cores containing residual oil*

| Core No. | Core Material | Brine Resistivity, ΩM | Wetting Agent Used | $p_1$: Core Resistivity Before Contact With Wetting Agent, ΩM | $p_2$: Core Resistivity After Contact With Wetting Agent, ΩM | $\frac{p_2}{p_1}$ |
|---|---|---|---|---|---|---|
| B-5-B | Berea Sandstone | 0.0435 | A | 1.24 | 2.15 | 1.73 |
| B-6-B | do | 0.0435 | A | 1.23 | 2.18 | 1.77 |
| B-7-B | do | 0.0435 | A | 1.20 | 3.14 | 2.62 |
| Q-3 | Fused Quartz | 0.0435 | A | 0.28 | 0.73 | 2.6 |
| Q-4 | do | 0.0435 | A | 0.28 | 0.65 | 2.3 |
| Q-5 | do | 0.0435 | A | 0.29 | 0.93 | 3.2 |
| S-261 | Seeligson Field Core | 0.0435 | A | 0.94 | 1.72 | 1.8 |
| B-228 | Borregos Field Core | 0.0435 | A | 1.13 | 2.14 | 1.89 |
| B-11-B | Berea Sandstone | 0.987 | B | 31.6 | 48.3 | 1.56 |
| B-12-B | do | 0.987 | C | 31.3 | 80.3 | 2.56 |
| B-13-B | do | 0.987 | D | 30.5 | 57.1 | 1.87 |
| B-14-B | do | 0.987 | E | 32.2 | 61.2 | 1.90 |
| B-15-B | do | 0.987 | F | 30.2 | 42.2 | 1.40 |
| B-22-B | do | 0.987 | G | 27.0 | 53.1 | 1.97 |
| B-23-B | do | 0.987 | H | 29.5 | 42.5 | 1.44 |
| B-25-B | do | 0.987 | I | 28.9 | 40.0 | 1.38 |
| B-26-B | do | 0.987 | J | 28.6 | 36.2 | 1.27 |
| B-27-B | do | 0.987 | K | 30.0 | 40.9 | 1.36 |
| B-29-B | do | 0.987 | L | 30.0 | 41.7 | 1.39 |
| B-32-B | do | 0.987 | M | 27.2 | 47.2 | 1.74 |

A. Octadecyl amine acetate.
B. Cetyl dimethyl amine acetate.
C. Tetrosan (a cationic surface active agent sold by Onyx Oil & Chemical Co., Jersey City, N. J.).
D. Primene JM-T acetate (prepared from a mixture of primary amines containing branched alkyl chains of 18 to 24 carbon atoms sold by Rohm & Haas).
E. Arquad 2-C (dicoco dimethyl ammonium chloride).
F. Amine acetate prepared from primene 81-R (a mixture of primary amines containing branched alkyl chains of 12 to 15 carbon atoms sold by Rohm & Haas).
G. Hyamine 2389 (alkyl ($C_9$-$C_{15}$) tolylmethyl trimethyl ammonium chloride).
H. Roccal (alkyl dimethyl benzyl ammonium chloride).
I. BTC (lauryl benzyl dimethyl ammonium chloride).
J. G5-898 (a bis-quaternary salt. Reaction product of 2-octyl benzyl chloride and bis-dimethyl amino butyne).
K. F3-428B (a bis-quaternary salt. Reaction product of nonylbenzyl chloride and bis-dimethyl amino butene).
L. Hyamine 10X (di-isobutylcresoxyethoxyethyl dimethyl benzyl ammonium chloride).
M. Hyamine 1622 (di-isobutylphenoxyethoxyethyl dimethyl benzyl ammonium chloride).

It will be seen from the data presented in Table II that in all cases the ratios of electrical resistivity of the core before and after the contacting was above about 1.3 and, in most instances, above about 1.7. These data conclusively show that when residual hydrocarbons are present a high electrical resistivity ratio is obtained. Comparing these data with the data in Table I, it will be seen that in all cases the presence of hydrocarbons is indicated by the contacting operations where hydrocarbons were present and where the cores were contacted with a solution containing the surface active agent of the type illustrated.

The invention is also applicable to other logging devices and methods of obtaining electrical logs. Thus the invention may be practised using the conventional potential well logging device and methods such as described in the work entitled "Subsurface Geologic Methods," compiled and edited by L. W. LeRoy and Harry M. Crain, Department of Publications, Colorado School of Mines, Golden, Colorado, 1949, and U. S. Patent 1,913,293, issued June 6, 1933, to Conrad Schlumberger. In practising the invention employing the potential electrical log, an electrical log is run and the potential of the particular strata recorded. Thereafter, the well bore is treated with an effective amount of the surface active agent which causes preferential wetting of the rock solids by the residual hydrocarbons contained therein. Then the potential electrical log is run again and the difference in potential noted.

In order to illustrate this aspect of the invention a typical shaly sandstone core plug was prepared to contain 5500 p. p. m. brine and residual oil (kerosene). This core plug was then placed in a device for measuring the potential difference developed between solutions contacting the ends of the core plug.

The solution contacting one end of the core plug was 70,000 p. p. m. NaCl in water. The solution contacting the other end of the core plug was 5500 p. p. m. NaCl in water.

A potential difference of 15 mv., dilute positive, was developed between the two solutions. This value is typical of shaly sandstone cores.

The core was then removed from the potential measuring device and flushed with brine containing an amine acetate prepared from coconut oil. (The "average" molecule of these primary amines contains 13 carbon atoms.)

When the effluent indicated that this agent had reached all parts of the core, the core was flushed with 5500 p. p. m. brine to assure uniform salinity of the interstitial water.

The potential measurement described above was repeated. This time no potential difference was recorded, i. e., the potential difference was zero.

The above run was repeated with another shaly sandstone core plug from the same formation. A normal potential difference of 11.5 mv., dilute positive, was observed. After contact with the agent, the potential difference was again zero.

The run was repeated still again with another shaly sandstone core plug from the same formation. This time, however, the core was prepared without residual oil, i. e., the core was completely brine saturated. A potential difference of 9.0 mv., dilute positive, was observed. After contact with the agent, the potential difference was 6.5 mv., dilute negative.

It will be clear from the foregoing several examples that we have discovered that the electrical resistivity or potential of a formation containing residual oil is significantly changed after contact with an aqueous solution containing a relatively small amount of a surface active agent which causes preferential wetting of the formations by any hydrocarbons present therein. Based on this discovery, we have devised a new and improved method by way of which hydrocarbons may be determined and detected in subsurface earth formations which heretofore could not be detected readily. This is quite advantageous and useful in that a method is provided which indicates directly and allows the presence or absence of hydrocarbons in a particular subsurface earth formation to be determined.

While the invention has been illustrated and described with reference to electrical logging in which the electrical resistivity or electrical potential is determined, it is to be understood that other electrical logs may be employed in the practice of the invention. Likewise, the description taken with the several figures of the drawing is with reference to electrical resistivity apparatus but it is also to be understood that apparatus wherein the electrical potential of the strata is obtained may be substituted therefor.

The present invention is particularly advantageous and useful in thin formations, such as in the Gulf Coast area where there has been invasion of water. In the present invention these thin formations are detectable where hydrocarbons are present which heretofore has not been possible.

Furthermore, the present invention is particularly applicable to detecting hydrocarbon-containing sands wherein there are multiple hard or dense streaks; in other words, permeable sections between less permeable sections and there is water or filtrate invasion.

The present invention is also applicable to low or high porosity zones where there has been massive invasion of water or filtrate.

Also the invention is particularly applicable to shaly sands which have not been recognized as such by the potential curve. In the present invention it is possible to detect and locate such sands. Also the invention has use in limestone formations where water invasion has been great, these formations having particularly high resistivity.

This invention is not to be limited by any of the several examples which are given by way of illustration and not by way of limitation.

The nature and objects of the present invention having been completely described and illustrated, what we wish to claim as new and useful and to secure by Letters Patent is:

1. A method for logging a well bore penetrating subsurface earth formations for the presence of hydrocarbons in said earth formations which comprises obtaining the electrical resistivity of said earth formations, contacting said earth formations with a solution containing a surface active agent consisting of a water soluble cationic salt which causes preferential wetting of said earth formations by any hydrocarbons present therein and then obtaining the electrical resistivity of said contacted earth formations whereby the presence of hydrocarbons in said earth formations is indicated.

2. A method in accordance with claim 1 in which the agent is a nitrogen compound.

3. A method in accordance with claim 1 in which the earth formations have been flooded with filtrate from drilling fluid before the obtaining of the electrical resistivity thereof.

4. A method for logging a well penetrating subsurface earth formations for the presence of hydrocarbons in said earth formations which comprises obtaining the electrical resistivity of said earth formations, recording said electrical resistivity, contacting said earth formation with a solution containing a surface active agent consisting of a water soluble cationic salt which causes preferential wetting of said earth formations by any hydrocarbons present therein, obtaining the electrical resistivity of said contacted earth formations, recording the electrical resistivities of said contacted earth formations whereby the presence of hydrocarbons in said earth formations is indicated.

5. A method for logging a well bore penetrating subsurface earth formations for the presence of hydrocarbons in said earth formations which comprises obtaining the electrical resistivity of said earth formations, recording said electrical resistivity, contacting said earth formations with a solution containing a surface active agent consisting of a water soluble cationic salt which causes preferential wetting of said earth formations by any hydrocarbons present therein, obtaining the electrical resistivity of said contacted earth formations, recording the electrical resistivity of said contacted earth formations, and obtaining a difference between the electrical resistivity of said earth formations before and after said contact whereby the presence of hydrocarbons in said earth formations is indicated.

6. A method for logging a well drilled to penetrate subsurface earth formations in which a well bore is formed having a filter cake deposited on the wall thereof which comprises disrupting said filter cake, obtaining the electrical resistivity of the earth formations back of said disrupted filter cake, contacting said earth formations back of said disrupted filter cake with a solution containing a surface active agent consisting of a water soluble cationic salt which causes preferential wetting of said earth formations back of said disrupted filter cake by any hydrocarbons present therein, obtaining the electrical resistivity of said contacted earth formations back of said disrupted filter cake whereby the presence of hydrocarbons in said earth formations is indicated.

7. A method in accordance with claim 6 in which the electrical resistivities of the earth formations before and after said contact are recorded electrically.

8. A method for logging a well bore penetrating subsurface earth formations for the presence of hydrocarbons in said earth formations which comprises obtaining an electrical log of said earth formations, contacting said earth formations with a solution containing a surface active agent consisting of a water soluble cationic salt which causes preferential wetting of said earth formations by any hydrocarbons present therein, and then obtaining an electrical log of said contacted earth formations whereby the presence of hydrocarbons in said earth formations is indicated.

9. A method in accordance with claim 8 in which the agent is as nitrogen compound.

10. A method in accordance with claim 8 in which the earth formations have been flooded with filtrate from drilling fluid before the obtaining of the first electrical log thereof.

11. A method for logging a well bore penetrating subsurface earth formations for the presence of hydrocarbons in said earth formations which comprises obtaining the electrical potential of said earth formations, contacting said earth formations with a solution containing a surface active agent consisting of a water soluble cationic salt which causes preferential wetting of said earth formations by any hydrocarbons present therein, and then obtaining the electrical potential of said contacted earth formations whereby the presence of hydrocarbons in said earth formations is indicated.

12. A method for logging a well penetrating subsurface earth formations for the presence of hydrocarbons in said earth formations which comprises obtaining the electrical potential of said earth formations, recording said electrical potential, contacting said earth formation with a solution containing a surface active agent consisting of a water soluble cationic salt which causes preferential wetting of said earth formations by any hydrocarbons present therein, obtaining the electrical potential of said contacted earth formations, recording the electrical potentials of said contacted earth formations whereby the presence of hydrocarbons in said earth formations is indicated.

13. A method for logging a well bore penetrating subsurface earth formations for the presence of hydrocarbons in said earth formations which comprises obtaining the electrical potential of said earth formations, recording said electrical potential, contacting said earth formations with a solution containing a surface active agent consisting of a water soluble cationic salt which causes preferential wetting of said earth formations by any hydrocarbons present therein, obtaining the electrical potential of said contacted earth formations, recording the electrical potential of said contacted earth formations, and obtaining a difference between the electrical potential of said earth formations before and after said contact whereby the presence of hydrocarbons in said earth formations is indicated.

14. A method for logging a well drilled to penetrate subsurface earth formations in which a well bore is formed having a filter cake deposited on the wall thereof which comprises disrupting said filter cake, obtaining the electrical potenital of the earth formations back of said disrupted filter cake, contacting said earth formations back of said disrupted filter cake with a solution containing a surface active agent consisting of a water soluble cationic salt which causes preferential wetting of said earth formations back of said disrupted filter cake by any hydrocarbons present therein, obtaining the electrical potential of said contacted earth formations back of said disrupted filter cake whereby the presence of hydrocarbons in said earth formations is indicated.

15. A method in accordance with claim 14 in which the electrical potentials of the earth formations before and after said contact are recorded electrically.

16. A method in accordance with claim 14 in which the surface active agent is used in an aqueous solution in an amount in the range between about 0.1 to about 10 volumes containing from about 0.01 to about 5% by weight of the surface active agent.

17. A method for logging a subsurface earth formation for the presence of hydrocarbons in said earth formation for the presence of hydrocarbons in said earth formation which comprises contacting said earth formation with a surface active agent consisting of a water soluble cationic salt which causes preferential wetting of said earth formation by any hydrocarbons present therein, obtaining the electrical potential of said contacted earth formation, and recording the electrical potential of said contacted earth formation whereby the presence of hydrocarbons in said earth formation is indicated by said recorded electrical potential.

18. A method in accordance with claim 17 in which the surface active agent is used in a solution in an amount in the range between about 0.1 to about 10 volumes containing from 0.01 to about 5% by weight of the surface active agent.

19. A method in accordance with claim 17 in which the agent is a nitrogen compound.

20. A method in accordance with claim 17 in which the agent is an ammonium salt.

21. A method in accordance with claim 17 in which the agent is an amine acetate.

22. A method in accordance with claim 17 in which the agent is a quaternary ammonium salt.

23. A method for logging a subsurface earth formation for the presence of hydrocarbons in said earth formation which comprises contacting said earth formation with a surface active agent consisting of a water soluble cationic salt which causes preferential wetting of said earth formation by any hydrocarbons present therein, obtaining the electrical resistivity of said contacted earth formation, and recording the electrical resistivity of said contacted earth formation whereby the presence of hydrocarbons in said earth formation is indicated by said recorded electrical resistivity.

24. A method in accordance with claim 23 in which the surface active agent is used in a solution in an amount in the range between about 0.1 to about 10 volumes containing from about 0.01 to about 5% by weight of the surface active agent.

25. A method for logging a subsurface earth formation for the presence of hydrocarbons in said earth formation which comprises contacting said earth formation with a surface active agent consisting of a water soluble cationic salt which causes preferential wetting of said earth formation by any hydrocarbons present therein, obtaining an electrical log of said contacted earth formation, and recording the electrical log of said contacted earth formation whereby the presence of hydrocarbons in said earth formation is indicated by said recorded electrical log.

26. A method in accordance with claim 25 in which the surface active agent is used in a solution in an amount in the range between about 0.1 to about 10 volumes containing from about 0.01 to about 5% by weight of the surface active agent.

27. A method in accordance with claim 25 in which the agent is a nitrogen compound.

References Cited in the file of this patent

UNITED STATES PATENTS 2,691,757     Salimbeni                Oct. 12, 1954